Sept. 1, 1964  F. SINGER ETAL  3,146,689
PHOTOGRAPHIC SHUTTER

Filed July 16, 1962  5 Sheets-Sheet 1

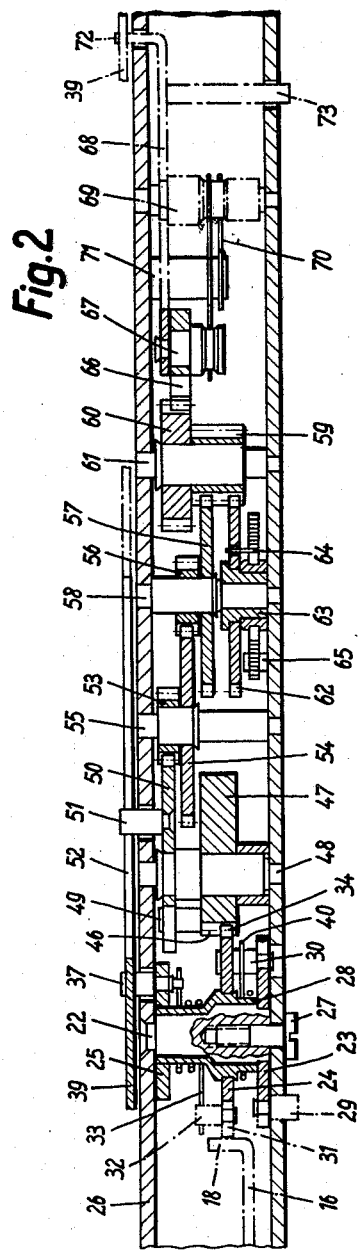
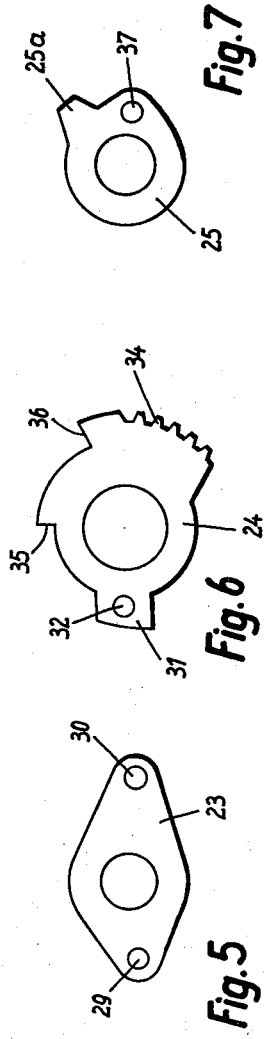

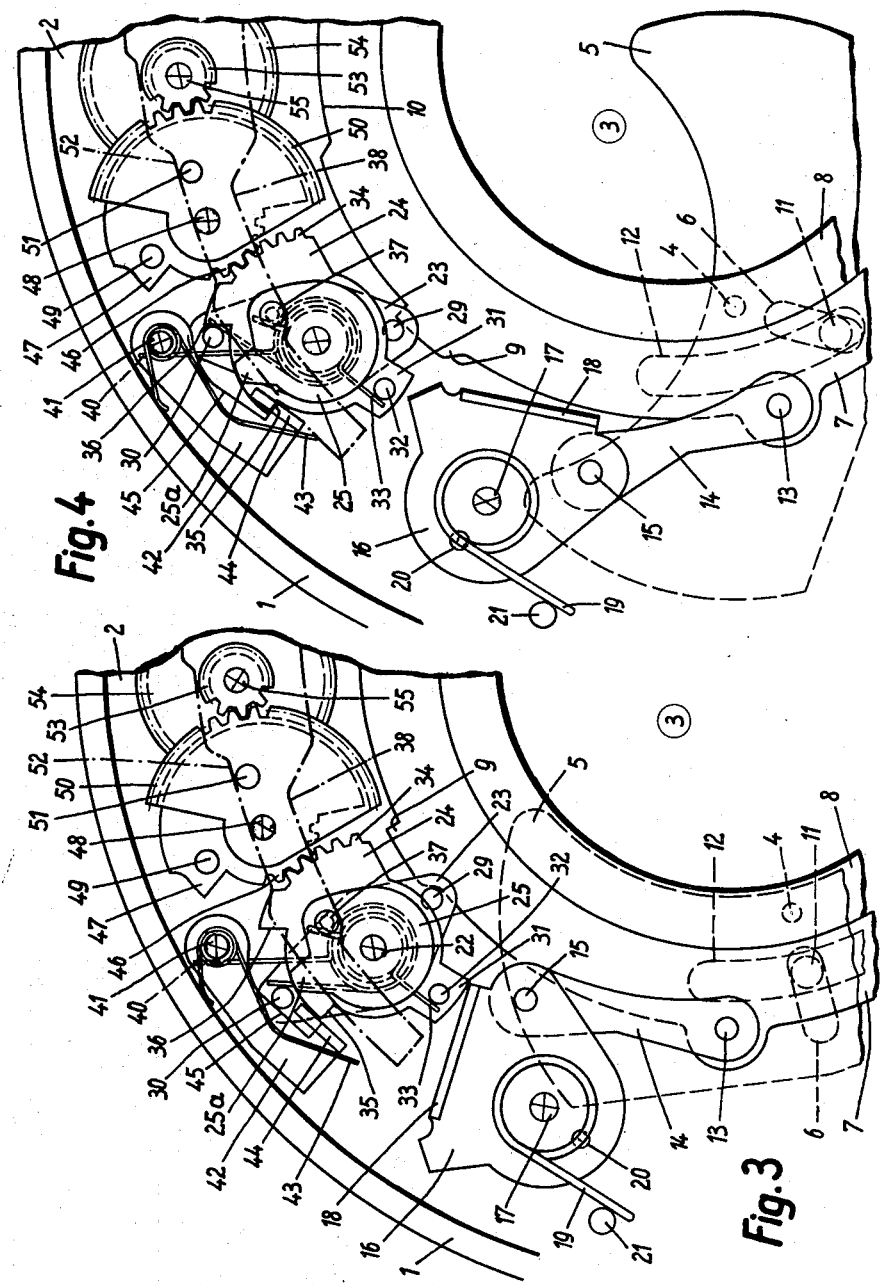

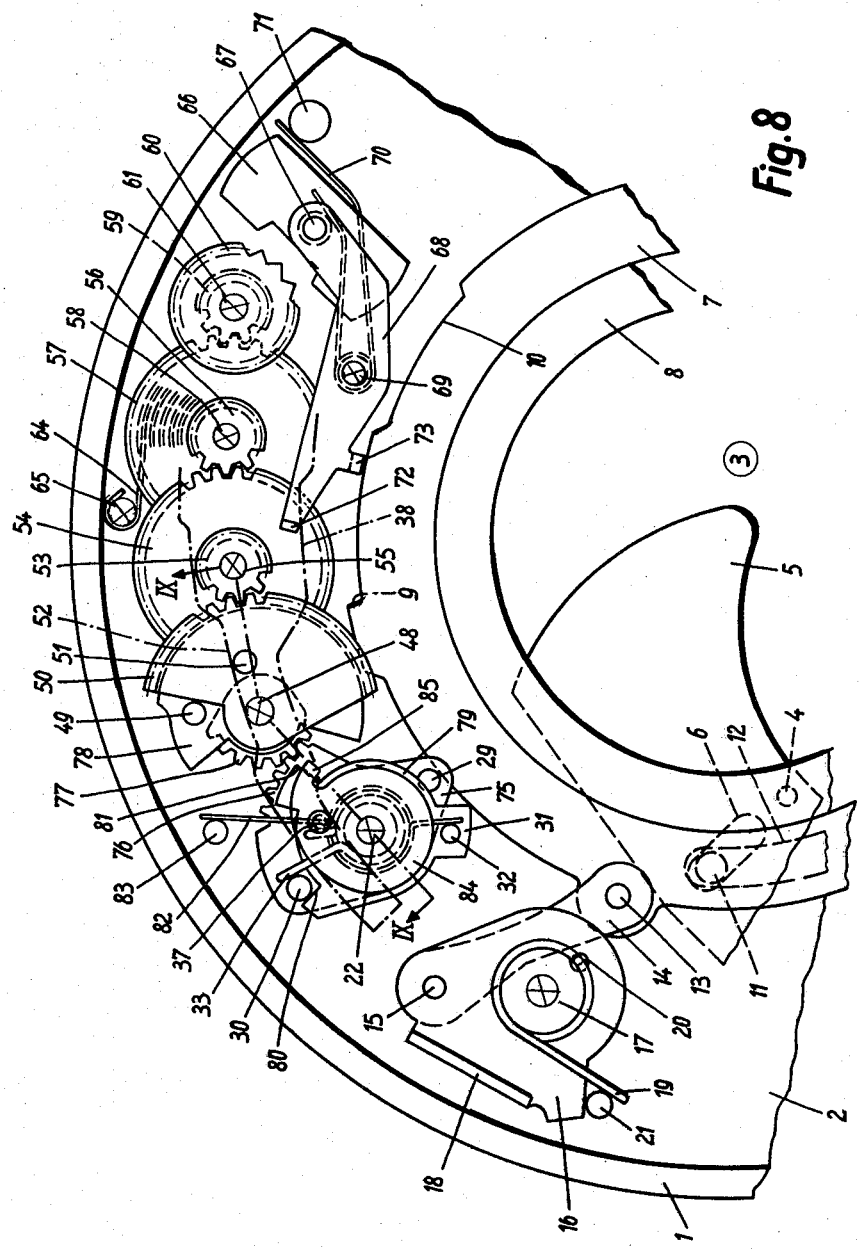

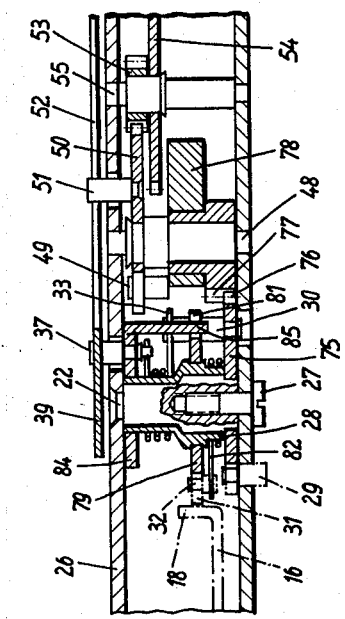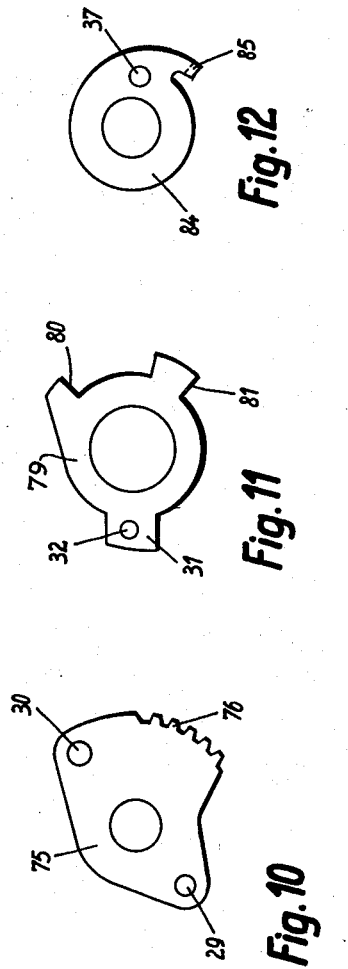

United States Patent Office 3,146,689
Patented Sept. 1, 1964

3,146,689
PHOTOGRAPHIC SHUTTER
Franz Singer and Franz Eberl, Munich, Germany, assignors to Compur-Werk G.m.b.H. & Co., Munich, Germany, a firm of Germany
Filed July 16, 1962, Ser. No. 210,089
Claims priority, application Germany July 20, 1961
15 Claims. (Cl. 95—63)

This invention relates to a photographic shutter, and more particularly to retarding means for retarding the operation of the shutter blades, in order to control the speed or duration of the exposure.

An object of the invention is the provision of generally improved and more satisfactory retarding means.

Another object is the provision of retarding means of the gear train type, so designed as to hold the shutter blades stationary in an open position for the required time, the retarding means having its own spring power to drive the gear train in a running-down direction so that the main power spring or master spring for opening and closing the shutter blades does not have the additional burden of driving the retarding gear mechanism.

Still another object is the provision of such retarding means so designed as to be sturdy and reliable in use, and capable of economical manufacture.

A further object is the provision of retarding means of the character above mentioned, having a compact design so that it requires no more room in the shutter housing than conventional retarding means previously employed.

These and other desirable objects may be attained in the manner disclosed as an illustrative embodiment of the invention in the following description and in the accompanying drawings forming a part hereof, in which:

FIG. 2 is a somewhat schematic section taken approximately on the line II—II of FIG. 1, but with certain parts rotated to different positions for better illustration;

FIG. 3 is a view similar to a fragment of FIG. 1, illustrating the parts in an intermediate position during the runing-down cycle, with the shutter blades fully open and the retarding mechanism just begining to operate;

FIG. 4 is a similar view with the parts in the cocked or tensioned position, ready for making an exposure;

FIG. 5 is a face view of a cocking or tensioning lever according to the first form of the invention;

FIG. 6 is a face view of an interceptor member according to the first form of the invention;

FIG. 7 is a face view of a supporting or abutment member according to the first form of the invention;

FIG. 8 is a view similar to FIG. 1, illustrating a second embodiment of the present invention, the parts being shown in a position corresponding to that of FIG. 1;

FIG. 9 is a schematic section taken approximately on the line IX—IX of FIG. 8; and FIGS. 10, 11, and 12 are views respectively similar to FIGS. 5, 6, and 7, illustrating these respective parts according to the second embodiment of the invention.

Figure 1:
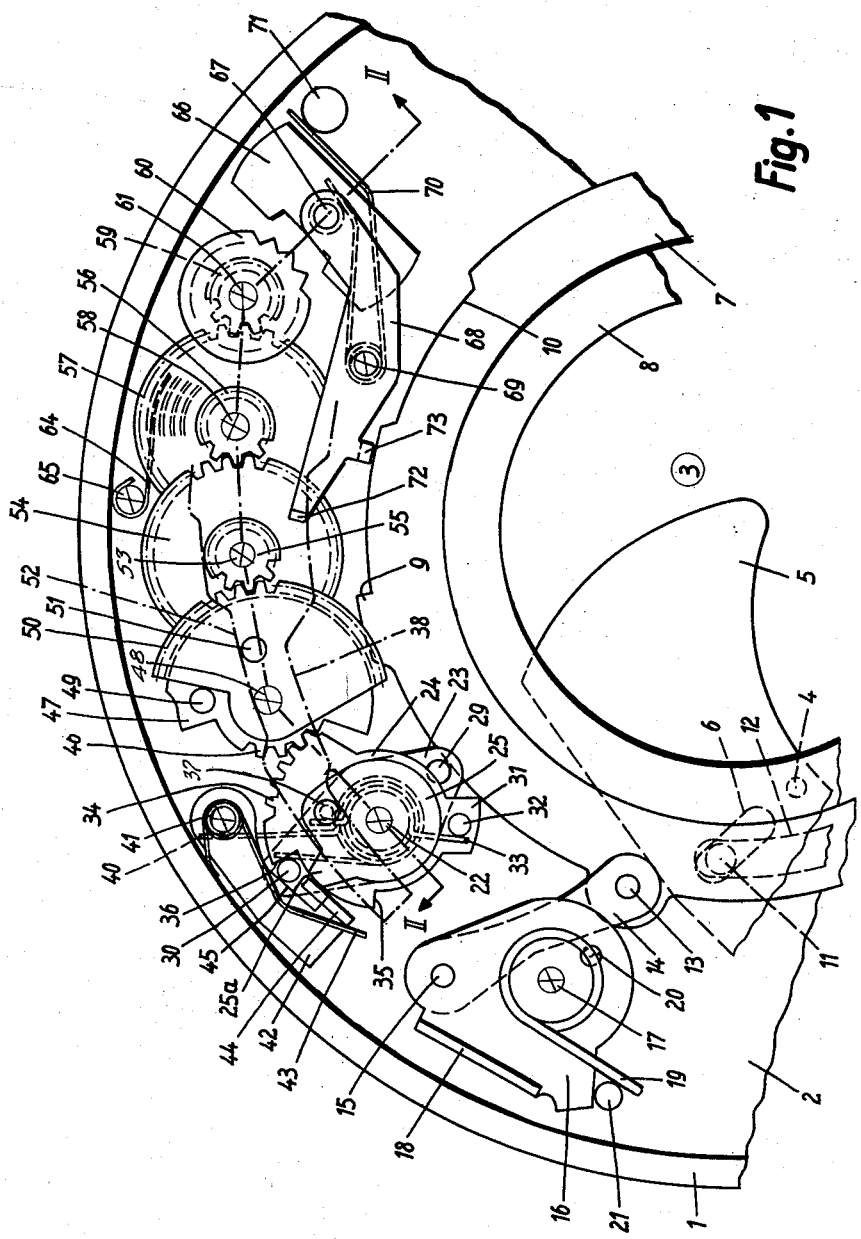
FIG. 1 is a fragmentary plan or front face view of those portions of the shutter necessary for an understanding of a first embodiment of the present invention, with parts unnecessary to an understanding of the invention omitted, the parts being shown in the run-down or rest position at the completion of an exposure.

Describing the first embodiment of the invention, and referring particularly to FIG. 1, the apparatus includes the usual conventional shutter housing or casing of annular form, having an outer cylindrical wall 1, within which is mounted a base plate or mechanism mounting plate 2. The casing is provided with the usual central opening or aperture 3 for the passage of light when making an exposure. Pivotally mounted on the pivots 4 on the back of the base plate 2 are the shutter blades 5, of any desired number, usually about five blades being employed in the conventional manner, but only one of such blades is shown in the present drawings, for the sake of simplicity. Each shutter blade 5 has a driving slot 6.

The blade actuating ring 7 rotates concentrically around the optical axis which passes centrally through the aperture 3. The blade ring 7 conveniently rotates on the stationary collar or tubular portion 8 of the base plate, being held against axial displacement in any suitable known way. The outer edge of the blade ring is formed partially like a cam, having an outwardly extending projection 9 at one place on its circumference, and a recess or depressed portion 10 at another place on its circumference, the recess 10 having sloping or oblique ends as well as seen in FIG. 1. The blade ring also carries a series of pins 11, equal in number to the number of shutter blades, each pin projecting through an arcuate slot 12 in the base plate 2 and slidably engaging the slot 6 in one of the shutter blades.

A pivot pin 13 on the blade ring 7 serves to mount one end of the operating link 14, the other end of which is pivotally fastened at 15 to the main shutter drive member or master member 16 which is fast on a cocking shaft or tensioning shaft 17 which is rotatably mounted in the base plate 2 and which extends in a direction parallel to the optical axis but is held against axial movement. The shaft 17 is operated in any conventional known way from the rear of the shutter assembly or from the body of the camera on which the shutter is mounted. The driver or master member 16 has an upstanding flange 18 along one edge, for cooperation with the retarding gear mechanism as further described below. The main drive spring or master spring 19 has one end bent at an angle and extending downwardly into an opening 20 in the member 16, the other end of the spring engaging a fixed pin or stop 21. The spring acts in a direction to tend to turn the master member 16 counterclockwise.

For convenience of description, the word "up" is here used as meaning up in a direction from the plane of the paper of FIGS. 1, 3, and 4 toward the eye of the observer, while "down" means the opposite direction, from the plane of the paper of FIGS. 1, 3, and 4 away from the eye of the observer.

Although many features of the present invention are not necessarily limited to a shutter having blades of the double-ended type, nevertheless the illustrative embodiment of the invention does have such blades. In the cocked or tensioned position of the shutter parts as illustrated in FIG. 4, it will be observed that the first end or lobe of each shutter blade 5 extends across part of the light aperture 3, and the corresponding ends of all of the blades collectively serve to close this aperture 3. As the shutter runs down from tensioned position toward rest position, the blades are swung in a single direction to an intermediate position in which all of the blades are in non-obstructing relation to the aperture 3 (this fully open position being shown in FIG. 3) and then the blades continue to swing in the same direction until, in the final or run-down position of the parts, the second end or lobe of each blade extends partially across the aperture 3 as illustrated in FIG. 1, the corresponding ends of all of the blades together serving to overlap each other and close the aperture completely, as well understood in the art. From this run-down or rest position shown in FIG. 1, the shutter is cocked or tensioned, ready for the next exposure, by turning the shaft 17 through part of a revolution in a clockwise direction, from the position shown in FIG. 1 to the position shown in FIG. 4, thereby turning the master member 16 and winding up the master spring 19. As above stated, this is accomplished by any suitable connection of known form on the rear part of the shaft 17, preferably in the body of the camera to which the shutter is attached, and any suitable form of known latching means serves to hold the shaft 17 in its cocked or tensioned position until it is released or triggered in known manner to make the next exposure. During this clockwise or winding-up motion of the master member 16, the link 14 moves the blade ring 7 in a counterclockwise direction, thereby swinging the double-ended blades 5 counterclockwise from their rest positions shown in FIG. 1 to their cocked or tensioned positions shown in FIG. 4, and during this motion the blades once more uncover the exposure aperture 3, but at this time the photographic film is protected by a cover flap or other suitable means well known in the art, not constituting part of the present invention, so that the film will not be undesirably exposed or fogged during the tensioning of the shutter.

As the master member 16 swings in a counterclockwise direction during the exposure cycle, the upstanding flange 18 thereof engages the retarding means of the present invention, and such engagement momentarily stops the motion of the master member in an intermediate position while the shutter blades are fully open (position of FIG. 3) to produce an exposure of the desired length or duration. The retarding means includes a first shaft 22 on which are rotatably mounted a cocking or tensioning lever 23 near the bottom of the shaft 22 (see FIG. 2), and above this an interceptor plate 24, and at the top of the shaft an abutment plate 25. These three parts are preferably of the shapes separately shown in FIGS. 5, 6, and 7, respectively. The upper end of the shaft 22 is preferably riveted to an overlying stationary plate 26, while the lower end of the shaft is firmly held by a screw 27 passing through the bottom plate 2. A bushing 28 has a tight press fit on the shaft 22, and has a portion which forms a rotary bearing for the interceptor member 24 and serves to space this member 24 at the proper elevation intermediate between the members 23 and 25.

The member 23 does not serve to tension the main shutter blade operating mechanism, but it does serve to cock or tension the retarding means, which is driven by its own spring power, as above mentioned. Hence the member 23 may appropriately be called a cocking or tensioning lever. It carries a pin 29 which cooperates with the cam-like projection 9 on the outer edge of the blade ring 7. As the blade ring turns in a counterclockwise direction from the run-down position of FIG. 1 to the tensioned or cocked position of FIG. 4, this projection 9 on the blade ring engages the pin 29 on the tensioning lever 23 and swings the tensioning lever in a clockwise direction from the position of FIG. 1 to the position of FIG. 4, so that a second pin 30, projecting upwardly from the lever 23, engages a shoulder 36 on the interceptor plate 24 to swing this plate also in a clockwise direction, as further mentioned below. A light restoring spring 40, wound around the lower part of the bushing 28, bears at one end against a fixed pin 40 and at the other end against the pin 30 of the lever 23, in a direction to tend to swing the lever in a counterclockwise direction to a normal rest position determined by a fixed stop (not shown) so that the spring 40 holds the lever 23 in this normal position except when it is displaced therefrom by the cam-like projection 9 on the blade ring 7.

The interceptor plate 24 has a projection 31 for engagement with the upstanding flange 18 on the master member 16, as shown in FIG. 3, to block the counterclockwise rotation of the master member in a position in which the blades are fully open. This projection 31 also carries an upstanding pin 32 for engagement with one end of the spring 33, which constitutes the main drive spring of the retarding mechanism. The spring 33 is wound around the upper portion of the bushing 28, and the second end of the spring 33 engages a downwardly projecting end of a pin 37 on the member 25 as will be further described below. The interceptor member 24 also includes a gear segment portion 34 for transmission of torque to other members of the retarding gear means, and has two abutment portions or shoulders 35 and 36 which extend approximately radially with respect to the axis of rotation of the member 24, as seen in FIG. 6. The shoulder 36 is engaged by the pin 30 on the member 23, to swing the interceptor member 24 in a clockwise direction during the cocking or tensioning of the retarding means, as already mentioned above. The other shoulder 35 serves as a latching shoulder for engagement by the latch member 42, as further described below.

The abutment member or supporting member 25, rotatable on the upper end of the bushing 28 just beneath the top plate 26, has a projecting portion 25a which controls the latch 42 under certain conditions as further described below, and also has a pin 37 fixed to the member 25. The lower end of the pin 37 projects downwardly from the member 25 and engages the second end of the main drive spring or power spring 33 of the retarding means, as already mentioned above. The main portion of the pin 37 projects upwardly from the member 25, through a suitable arcuate slot in the plate 26, and the upper end of the pin 37 engages and is positioned by the shutter speed cam edge 38 of the shutter speed control member 39 which overlies and is movable with respect to the plate 26. Such speed control cams are well known in the art and the details thereof are unimportant for purposes of the present invention. The speed control member 39 may move or slide in the conventional manner for shutter speed adjustment purposes, the member usually being mounted, as well understood in the art, for rotation about the optical axis of the shutter.

The fixed pin 41 has already been mentioned above as holding one end of the restoring spring 40. In addition to this function, the pin 41 also serves for pivotally mounting the latching pawl 42, which is urged in a counterclockwise direction by the hairpin spring 43, wound around the pin 41 and bearing at one end against the stationary outer cylindrical wall 1 of the shutter housing, the other end of the hairpin spring bearing on the upstanding flange 44 of the latching pawl. At certain times, this flange 44 on the latching pawl engages the abutment shoulder 35 on the interceptor member 24, to hold this interceptor member in its cocked or tensioned position, against the force of its main drive spring 33 which tends to turn it in a counterclockwise direction. The latching pawl 32 also has an edge 45 which cooperates with the pin 30 on the cocking lever 23, in such a way that when the cocking lever moves back from its tensioned position (FIG. 4) to its normal rest position (FIG. 1 or FIG. 3) the pin 30 thereon will engage the edge 45 of the latching pawl 42 and displace this pawl to release the flange 44 thereof from the abutment shoulder 35 of the interceptor member 24.

The projection 25a on the support member or abutment member 25 serves, in certain positions, to engage the flange 44 on the latch 42 so as to hold this latch in an ineffective position where it cannot engage the shoulder 35 of the member 24. The rotary position of the member 25 is determined by the setting of the speed control cam 39, since the spring 33 always keeps the pin 37 of the member 25 in engagement with the speed control cam edge 38. When the speed control cam is set to a position for the fastest exposures, being the cam setting shown schematically in FIG. 1, the shape of the cam is such that it acts on the pin 37 to swing the member 25 to its maximum counterclockwise limit, thereby putting the projection 25a against the flange 44 of the latch 42, to hold the latch ineffective, as shown in FIG. 1.

If, however, the speed adjusting member 39 is rotated counterclockwise from the position shown in FIG. 1, this brings another part of the cam edge 38 to the pin 37 so that the pin 37 can move closer to the optical axis, thereby allowing the member 25 to turn clockwise under the influence of the spring 33, far enough so that the projection 25a no longer lies against the flange 44 of the latch 42, and the latch is now free to perform its latching function so far as permitted by other parts of the mechanism, such as the pin 30.

As already mentioned above, the interceptor member 24 has gear teeth 34. These gear teeth mesh with gear teeth 46 on a flywheel member 47 which is freely rotatable on a fixed pin 48. The flywheel is relatively thick (see FIG. 2) and heavy so as to have a relatively large mass and inertia. It carries an upwardly extending stud 49 for cooperation with one edge of an overlying gear segment or arcuate rack member 50 which is also freely rotatable on the pin 48.

A pin 51 fixed to the gear segment 50 projects upwardly through an arcuate slot in the plate 26 and engages a second speed cam edge on the shutter speed adjusting member 39, this second cam edge being schematically shown at 52. Through an intermediate train of gears, as further described below, the light restoring spring 64 constantly tends to turn the gear segment 50 in a counterclockwise direction so as to hold the pin 51 engaged with the edge of the cam 52. Thus the shape of the cam 52, set in accordance with the intended speed of the exposure to be made, determines the starting position of the gear segment 50 at the beginning of any given exposure.

The gear teeth of the gear segment or arcuate rack 50 mesh with the teeth of a pinion 53 which is coupled to turn with a gear 54, both being mounted on the shaft 55 preferably by both of them being tight press fits on the shaft, which shaft rotates in suitable bearings in the plates 2 and 26. The gear 54 meshes with another pinion 56 which is a tight press fit on a shaft 58, a further gear wheel 57 also being a tight press fit on the same shaft. The gear 57 meshes with a pinion 59 secured to turn with an escapement wheel or star wheel 60, each of these being a tight press fit on the shaft 61 rotatable in suitable bearings.

A gear wheel 62 is mounted on a bushing 63 which is freely rotatable on the lower part of the shaft 58, and which meshes with the same pinion 59 with which the gear 57 meshes. A light restoring spring 64 has one end anchored in a hole in the gear 62, and the other end is attached to a fixed pin 65. This spring tends to turn the gear 62 in a counterclockwise direction, thereby tending to turn the gears 53 and 54 in a clockwise direction, and to turn the gear 50 in a counterclockwise direction so as to hold the pin 51 thereof engaged with the edge of the cam 52, as already mentioned above, except when the pin 51 is swung away from the cam 52 by the superior force of the driving spring 33, during the running-down operation of the retarding means. The spring 64 also serves to take up any backlash in the retarding gear train.

The above mentioned escapement wheel 60 cooperates with an escapement lever or vibrating anchor member 66 which is free to oscillate on a pivot pin 67 mounted on one arm of a two-armed lever 68 pivoted on a fixed pin 69 intermediate its ends. A hairpin spring 70 is coiled around the pivot 69, and has one end bearing against a fixed pin 71, the other end of the spring engaging the lever 68 in a direction to tend to swing the pin 67 toward the escapement wheel 60. The second end of the lever 68 has two lugs 72 and 73, the lug 72 being in position to engage the cam edge 38 of the speed control cam 39, while the second lug 73 is in position to be engaged by the outer peripheral edge or cam edge of the blade ring 7. Thus the lever 68 is under the joint control of the members 7 and 38. In the rest or run-down position of the shutter mechanism, the lug 73 is beyond one end (the counterclockwise end) of the notch or depression 10 in the blade ring 7, so that the edge of the blade ring holds the lever 68 in a position wherein the escapement pallet 66 is out of engagement with the escapement wheel 60, regardless of the position of the cam edge 38. This is illustrated in FIG. 1. When the shutter is cocked or tensioned, the lug 73 will be beyond the opposite end (clockwise end) of the notch 10 in the blade ring 7, because the blade ring has now been moved in a counterclockwise direction from the position shown in FIG. 1, and the edge of the blade ring will again hold the lever 68 in the same position shown in FIG. 1, keeping the pallet or anchor 66 out of engagement with the escapement wheel 60. But during the running-down motion of the blade ring while an exposure is being made, there will be an interval while the notch or depression 10 is passing by the lug 73, and during this interval the lever 68 will be free to turn in a counterclockwise direction so far as the blade ring 7 is concerned, so that if the cam 38 permits it to do so, the lever 68 can swing so as to bring the escapement pallet 66 into engagement with the escapement wheel 60. At times, however, depending upon the setting of the speed control cam, the cam 38 will hold the lever 68 against any such movement, notwithstanding that the lug 73 is opposite the notch 10, and in other settings of the speed control cam, the cam may allow the lever 68 to swing part way toward its maximum counterclockwise position, thereby enabling partial engagement but not full depth of engagement of the anchor 66 with the escapement wheel 60.

Much of the operation of the mechanism will be readily understood from the foregoing detailed description of the construction. The operation as a whole may be briefly summarized as follows: assuming that the parts are in the rest or run-down position shown in FIG. 1, the shutter is tensioned or cocked ready for the next exposure, by turning the shaft 17 in a clockwise direction. This turns the master member 16 in the same direction, and winds or energizes the master driving spring 19. Because of the connecting link 14, the blade ring 7 is turned in a counterclockwise direction from the position shown in FIG. 1 to the position shown in FIG. 4, thereby swinging all of the shutter blades 5 from the final closed position shown in FIG. 1 to the initial closed position shown in FIG. 5, undesired exposure of the film meanwhile being prevented by a suitable cover flap or other protecting means of conventional form. During the counterclockwise motion of the blade ring 7, the cam projection 9 thereon will strike the pin 29 of the lever 23, which is the tensioning lever of the retarding means, and will swing this lever 23 in a clockwise direction against the force of its restoring spring 40. The pin 30 on this lever 23 will engage the shoulder 36 of the intercepting member 24 and thereby will turn the intercepting member 24 from its run down position shown in FIG. 1 to its tensioned position shown in FIG. 4. This clockwise swinging of the intercepting member 24 will cause counterclockwise rotation of the flywheel 47, and the gear 50 will follow along in a counterclockwise direction under the influence of the restoring spring 64, so far as permitted by the portion of the cam 52 which is opposite the pin 51 of the gear 50. Depending on the setting of the speed control cam, the counterclockwise rotation of the gear 50 will be arrested by engagement of the pin 51 with the cam, and thereafter the counterclockwise rotation of the flywheel 47 will continue, so that the pin 49 thereon pulls away from or recedes from the edge of the gear 50 so that a gap develops between the pin 49 and the gear 50, as seen in FIG. 4.

Toward the end of the clockwise rotation of the tensioning lever 23, the pin 30 thereon moves away from the edge 45 of the latching pawl 42. Thus the latching pawl would be free to swing counterclockwise to bring the flange 44 thereon into latching engagement with the shoulder 35 of the member 24, were it not for the position of the projection 25a on the member 25. This projection 25a may or may not engage the flange 44 to hold the latch 42 in an unoperative position, depending upon the setting of the speed control cam 39 and particularly the position of the edge 38 thereof. When the cam is set for exposures of very short duration, such as illustrated in FIG. 1, the edge of the cam 38 engages the pin 37 to hold the member 25 in a position wherein the projection 25a does lie against the latch 42, to prevent the latch 42 from moving to latching position. Thus the intercepting member 24 is not latched in its cocked or tensioned position, when exposures of the shortest duration are made. However, when the cam is set for exposures of longer duration, the pin 37 is allowed to swing to a position where the projection 25a does not interfere with the latch 42, and for such exposures, the latch 42 is effective to engage the shoulder 35 and hold the intercepting member 24 in its cocked or tensioned position, approximately at the completion of the cocking or tensioning motion caused by the cam 9 on the blade ring 7. Also, as the speed control cam is moved to set the shutter mechanism for successively longer exposures, the pin 37 is allowed to move still further toward the optical axis, thereby swinging the abutment member 25 further around in a clockwise direction, and since this member 25 serves as the anchor for one end of the main power spring 33 of the retarding means, it follows that this motion of the member 25 serves to relax somewhat the force or tension of the spring 33. Hence for exposures of longer duration, or slower shutter speeds, the retarding gear train is driven by a less powerful spring, while for exposures of shorter duration or faster shutter speed, the power spring 33 of the retarding means is wound up to a greater extent and has more power. During the counterclockwise motion of the blade ring 7, while the shutter is being tensioned, the notch 10 in the blade ring comes opposite the lug 73 of the lever 68, permitting the lug to drop into this notch so far as allowed by the cam 38, but at the end of the counterclockwise motion of the blade ring the notch 10 has moved beyond the lug 73 so that the vibrating anchor 66 is disengaged.

If it is desired to readjust the speed setting of the shutter, after the parts have been cocked or tensioned, this is easily accomplished, because there is very little impediment to the movement of the speed cam. In the tensioned position, just as in the run down position, the escapement anchor 66 is disengaged from the escapement wheel 60, so that there is very little resistance to rotation of the gear train as a result of bringing a different part of the cam 52 opposite the pin 51, which would cause some rotation of the gear 50 and the remainder of the gear train. Moreover, any such rotation of this part of the gear train does not require rotation of the flywheel 47 or the member 24, because the pin 49 of the flywheel is spaced from the gear 50 of the gear train and does not interfere with movement of the gear train. Any repositioning of the cam edge 38 with respect to the pin 37 causes only a swinging of the member 25, without causing any rotary motion of the flywheel 47 or the intercepting member 24. Hence this construction is particularly suitable where it is desired to set the shutter speed automatically, such as by means of a photoelectric cell which has only low power, easily sufficient to overcome the slight frictional resistance of the retarding means of the present invention, but which might not have enough power to overcome the greater frictional resistance of setting the shutter speed when using shutter retarding means according to the prior art.

When the operator is ready to make the actual exposure, he presses the usual conventional camera release member which in the conventional manner, unlatches the shaft 17 so that the main spring or master spring 19 can start to turn the master member 16 in a counterclockwise direction from the tensioned position shown in FIG. 4 toward the run down position shown in FIG. 1. This moves the blade ring 7 in a clockwise direction, swinging the shutter blades 5 clockwise. The first part of this motion opens the shutter blades to the fully open position shown in FIG. 3. As the projection or cam 9 moves clockwise, it releases the pin 29 so that the lever 23 can swing back (under the influence of its restoring spring 40) from the position shown in FIG. 4 to the position shown in both FIGS. 1 and 3. If the shutter speed control cam has meanwhile been set for one of the shortest or fastest exposures, the projection 25a on the member 25 will meanwhile have engaged the latch 42 so that the latch is held in an ineffective position and does not serve to latch the member 24. Therefore, under such conditions, when the member 23 swings counterclockwise toward its normal rest position, the member 24 follows along with it, and the intercepting or blocking portion 31 thereof moves out of the way of the flange 18 of the master member 16, before the master member turns to a position where this flange could otherwise be intercepted by the portion 31. However, if the speed control cam of the shutter has been set for a slower exposure of somewhat longer duration, then as above explained the member 25 will not block the latch 42, and the latch 42 will have become effective on the shoulder 35 of the member 24, to hold this member 24 in its tensioned position, wherein the portion 31 lies in the path of travel of the flange 18 of the master member 16. Just as the blade ring 7 reaches its intermediate position wherein the shutter blades are fully open (the position shown in FIG. 3) the trailing edge of the cam 9 on the blade ring passes beyond the pin 29 on the member 23, allowing the member 23 to turn all the way to its limit position in a counterclockwise direction, and this swings the pin 30 of the member 23 into engagement with the edge 45 of the latch 42, releasing the latch just as the shutter blades become fully opened.

When the latch 42 is thus released, the member 24 begins to run down in a counterclockwise direction, under the power of its spring 33. As above explained, the power of this spring is variable, being greater for an exposure of short duration and less for an exposure of longer duration. The counterclockwise rotation of the member 24 causes clockwise rotation of the flywheel 47, there being very little resistance to the rotation of these parts during the initial part of the movement, so that the parts 24 and 47 get up to a good speed of movement before the pin 49 on the flywheel engages the edge of the gear 50. Because of starting friction, the power required to start a gear train in operation is greater than the power required to keep it operating after it has started. The present invention, employing the flywheel 47, overcomes the difficulties often encountered in starting a gear train, because the inertia of the rapidly moving flywheel is available to provide additional power for setting the gear train into motion, when the pin 49 on the flywheel comes into contact with the gear 50. The gear train then starts to rotate, and the operation of the gear train proceeds at a rate dependent in part upon the power of the spring 33 (variable for different shutter speeds, as above explained) and in part upon the depth of engagement of the vibrating anchor member 66 with the escapement wheel 60, this degree of engagement being dependent upon the action of the cam edge 38 on the lug 72 of the lever 68. The power of the light restoring spring 64 is easily overcome by the much more powerful driving spring 33 of the retarding mechanism.

Just as the latch 42 is unlatched and the running down motion of the retarding means commences, the flange 18 of the master member 16 strikes the arcuate end of the projection 31 on the intercepting member 24, and this temporarily stops the running down motion of the master member, holding the shutter blades in fully open position until the running down motion of the retarding means progresses to the point where the trailing corner of the projection 31 passes beyond the end of the flange 18 on the master member. As soon as this happens, the master member 16 is free to resume its counterclockwise motion, and to continue the turning of the blade ring 7 in a clockwise direction, so that the shutter blades are closed from the open position shown in FIG. 3 to the final closed position shown in FIG. 1. All parts are now in their run down or rest positions, and must again be tensioned or cocked before the next exposure can be made.

A second embodiment of the invention, illustrated in FIGS. 8–12, is similar in many respects to the first embodiment, but differs in some details. In general, only the differences need be mentioned, and it will be understood that where no difference is mentioned, the construction is the same as that previously described, and repetition of description thereof will be unnecessary.

In this second embodiment, the cocking lever or tensioning lever of the gear retarding means is indicated at 75 instead of 23. It carries the same pins 29 and 30 carried by the lever 23 in the first embodiment. In addition, it also has gear teeth 76, which mesh with a geared quadrant or sector 77 which is firmly fixed to the flywheel 78, corresponding in purpose and function to the previous flywheel 47, and having the same pin 49 for engagement with the gear segment 50, in the same way in which the pin 49 of the previous flywheel engages the gear segment 50. The members 77 and 78 are freely rotatable on the pivot 48. The gear segment 50 is separately rotatable freely on the same pivot 48.

The intercepting member, corresponding to the member 24 in the first embodiment, is here indicated at 79, and is provided with projections 80 and 81. It also has the intercepting or blocking portion 31 and the pin 32, the same as in the previous embodiment. The member 79 is urged in a clockwise direction by a light restoring spring 82, wound around the bushing 28, one end of the restoring spring 82 bearing against the fixed pin 83 and the other end bearing against the pin 32.

The supporting abutment plate 25 of the first embodiment is here replaced, in the second embodiment, by a supporting abutment plate 84 which has a pin 37 performing the same function as the pin 37 in the first embodiment. In other words, the upper end of this pin engages the edge 38 of the speed setting cam, and the lower end of the pin serves as a support or anchor for the main driving spring 33 of the retarding means, the other end of the spring 33 reacting against the pin 30 of the member 75 in a direction tending to turn this member in a counterclockwise sense. The abutment plate 84 is also provided with a downwardly extending abutment portion 85 which forms a stop for engaging the projection 81 on the plate 79.

As can be seen in FIG. 8 the abutment 80 of the plate 79 may bear at times against the pin 30 of the tensioning lever 75, to transmit torque from the spring 33 through the pin 30 to the member 79. However, the abutment 80 is not necessarily in contact with the pin 30 at all times, because when the member 75 carrying the pin 30 swings in a clockwise direction, the member 79 carrying the abutment 80 may not be able to follow clockwise with it, as the abutment 81 on the member 79 may strike the ear or abutment 85 on the member 84, so that the member 79 may not be able to turn any further in a clockwise direction even though the member 75 may continue to turn in this direction.

This provides another way of controlling the delaying time or retarding time of the mechanism, giving additional reliability and flexibility as compared with the first embodiment of the invention. In the first embodiment, the intercepting member 24 always has the same starting position, if it lies in the path of the flange 18 at all. In other words, if the shutter is set (in the first embodiment) for a sufficiently slow shutter speed so that the blocking or intercepting member 24 becomes effective to stop the running-down of the master member, then the intercepting member 24 always has to run down through the same extent of travel, before releasing the master member. In the second embodiment, however, the initial starting position of the intercepting member 79 is controlled by the position of the abutment 85 on the member 84, which is controlled, in turn, by the action of the speed control cam 38 on the pin 37 of the member 84. Therefore, for exposures long enough to require some retardation but only slight retardation, the cam 38 can be so shaped that the abutment 84 initially holds the member 79 so that only a slight amount of movement of the member 79, in a running down direction, occurs before the flange 18 of the master member 16 is released from the blocking action. For slower shutter speeds, making exposures of longer duration, the action of the cam 38 on the pin 37 of the member 84 allows the member 84 to swing further in a clockwise direction (under the influence of the spring 33) so that the initial starting position of the intercepting member 79 can be farther around in a clockwise direction, thus putting a longer circumference of the arcuate blocking portion 31 in the path of the flange 18 on the master member 16. In other words, in addition to varying the power or tension of the drive spring 33, and varying the action of the vibrating anchor 66 with respect to the escapement wheel 60, and varying the size of the initial or starting gap between the driving pin 49 on the flywheel and the cooperating driven edge of the first gear 50 (all three of which variables are present also in the first embodiment) this second embodiment also has the fourth variable (not present in the first embodiment) of adjusting the extent to which the blocking or intercepting member must move before it releases the master member 16 for continuance of its movement. Thus a very accurate control of the retarding action, over a wide range, is possible.

The operation of the second embodiment may be very briefly summarized as follows: starting with the rest or run-down position illustrated in FIG. 8, the shutter is tensioned or cocked ready for the next exposure, by turning the shaft 17 and master member 16 in a clockwise direction, thereby swinging the blade ring 7 in a counterclockwise direction. During this counterclockwise swinging, the cam or abutment portion 9 on the blade ring engages the pin 29 on the member 75 and swings this member in a clockwise direction, thereby winding up or tensioning the drive spring 30 of the retarding mechanism. The action of the cam portion 9 of the blade ring always swings the member 75 to the same extent or same starting position, and this motion of the member 75, through the gear teeth 76 and 77, turns the flywheel 78 in a counterclockwise direction to its starting position, in which starting position the pin 49 has pulled away from the edge of the gear segment or arcuate rack 50.

Although the member 75 always swings to the same extent during the tensioning operation, the blocking member 79 does not necessarily swing to the full extent, but swings clockwise (attempting to follow the motion of the member 75) under the influence of its restoring spring 82, only until the abutment 81 on the member 75 comes into contact with the abutment 85 on the member 84, which member 84 has been positioned in accordance with the setting of the speed control cam 38, acting upon the pin 37. For the shortest possible exposures, the cam 38 will control the pin 37 so that the intercepting member 79 does not swing far enough to intercept the flange 18 of the master member 16 at all. For successively slower (longer duration) exposures, the action of the cam 38 on the pin 37 is such that, during the tensioning movement, the member 79 can swing farther around in a clockwise direction, thus placing a successively greater circumferential length of the blocking portion 31 in a position to obstruct or intercept the flange 18 of the master member 16.

When the shutter release is operated so that the master member 16 is unlatched and can turn in a counterclockwise direction under the influence of its main drive spring 19, the blade ring 7 moves in a clockwise direction just as in the first embodiment, and the cam 9 on the blade ring holds the pin 29 and the member 75 in the tensioned position until about the time that the shutter blades reach their fully open positions, at which time the cam 9 passes beyond the pin 29 and allows the member 75 to start running down in a counterclockwise direction under the influence of its drive spring 33. This immediately starts the flywheel 78 moving in a clockwise direction, so that the parts 75 and 78 attain considerable speed before the pin 49 strikes the edge of the gear segment 50, thus enabling the inertia or momentum of the flywheel to assist in overcoming the starting resistance of the gear train.

As the counterclockwise running down motion of the member 75 continues, the motion is transmitted to the member 79, either immediately (if the abutment 80 was initially in contact with the pin 30) or after an interval during which the pin 30 is moving toward and finally makes contact with the abutment 80 on the member 79. If there is initially a space between the pin 30 and the abutment 80, the parts 75 and 78 can move relatively quickly during the initial stages, until the pin 30 comes into contact with the abutment 80 and thereafter drives the member 79 in the same direction.

During this running down movement, while the master member 16 and blade ring 7 are temporarily stopped in an intermediate position, the notch 10 of the blade ring 7 is opposite the lug 73 of the lever 68, so that at this time the vibrating anchor 66 is engaged more or less with the escapement wheel 60, depending on the action of the cam 38 on the lug 72 of the lever 68, just as was the case in the first embodiment. Thus the extent of the cam 38 on the lug 72 of the lever 68, just as ment of the escapement, partly on the initial starting position of the gear segment 50 as determined by the action of the cam 52 on the pin 51, partly by the degree of tension or power of the driving spring 32 as determined by the action of the cam 38 on the pin 37, and partly on the initial starting position of the blocking portion 31 of the member 79, as determined likewise by the action of the cam 38 on the pin 37. When the blocking portion 31 is moved completely out of the way of the flange 18 of the master member, during the running down operation, the master memebr then resumes its interrupted travel, and completes the movement of the blade ring 7 in a clockwise direction, to close the shutter blades to terminate the exposure.

From the foregoing description it will be seen that the invention solves in a particularly simple way the problem of constructing retarding means with a driving spring of its own, so designed as to keep the retarded or blocked blade ring and shutter blades completely stationary during the desired period of delay, the retarding means also having its own source of power completely independent of the source of power for operating the shutter blades. In both embodiments, despite the advantages which are achieved, it is noteworthy that the space required for the accommodation of the retarding means is no greater than that required for a conventional retarding gear train. The second embodiment also provides additional control capability and facility, as compared with the first embodiment.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. Retarding means for a photographic shutter of the type having a shutter driving element, a shutter operating spring tending to move said driving element in one direction, said spring being tensioned by movement of said driving element in a reverse direction, and a movable shutter member operatively connected to said driving element, said shutter member moving in a tensioning direction concomitantly with movement of said element in said reverse direction to tension said operating spring, said retarding means comprising a second spring separate from said shutter operating spring, a cocking lever loaded by said second spring to tend to turn said cocking lever in a first direction, said cocking lever having a portion lying in the path of travel of said shutter member to turn said cocking lever in a reverse direction to tension said second spring by the motion of said shutter member in its said tensioning direction, an intercepting member lying displaceably in the path of movement of said driving element to block movement of said shutter driving element at an intermediate point of its motion in said one direction, a retarding gear train including a flywheel, and an operative connection between said cocking lever, said intercepting member, and said flywheel for effecting conjoint movement thereof.

2. A construction as defined in claim 1, wherein said intercepting member is formed on a separate lever swingable concentrically with said cocking lever.

3. A construction as defined in claim 1, wherein said operative connection between said cocking lever and said flywheel includes gear teeth formed on a separate lever swingable concentrically with said cocking lever and operatively connected therewith.

4. A construction as defined in claim 1, wherein said operative connection between said cocking lever and said flywheel includes gear teeth formed directly on said cocking lever.

5. A construction as defined in claim 1, wherein said gear train includes other gears subsequent to and driven by said flywheel, and wherein there is an initial lost-motion driving relation between said flywheel and said other gears, so that said flywheel may start its motion without causing movement of said other gears and the momentum of said flywheel may be used to assist in starting movement of said other gears.

6. A construction as defined in claim 5, wherein said other gears include an escapement wheel and a vibrating escapement anchor mounted on a pivot displaceable toward and away from said escapement wheel to vary the degree of engagement therewith.

7. A construction as defined in claim 1, further including a shutter speed control cam, and means controlled by said cam for varying the tension of said second spring.

8. A construction as defined in claim 1, further including a latch for latching said intercepting member in a position to intercept movement of said driving element, and means operated by movement of said cocking lever for releasing said latch.

9. A construction as defined in claim 1, further including a latch for latching said intercepting member in a position to intercept movement of said driving element, a shutter speed control cam, an abutment lever mounted for swinging movement concentrically with said cocking lever, the position of said abutment lever being controlled by said speed control cam, a portion on said abutment lever for rendering said latch inoperative when said abutment lever is in one position, and a portion on said abutment lever serving as an abutment for said second spring to vary the tension of said second spring according to variations in the position of said abutment lever as determined by the position of said speed control cam.

10. Retarding means for a photographic shutter, comprising a movable member for blocking blade-closing movement of a shutter, spring means tending to move said member to a non-blocking position, a flywheel moving with said member, and a retarding gear train having a first gear adjacent said flywheel to be driven by movement of said flywheel, the parts being so positioned that there is an initial gap between a driving part of said flywheel and a driven part of said first gear, so that said flywheel may attain initial velocity before engaging said first gear and so that the momentum energy of said flywheel may assist in starting movement of said retarding gear train.

11. A construction as defined in claim 10, further including a shutter speed control cam for varying the size of said initial gap between said flywheel and said first gear.

12. A construction as defined in claim 10, further including a shutter speed control cam for varying both the size of said initial gap between said flywheel and said first gear, and the initial position of said movable blocking member, thereby to vary the extent to which said member must move before it reaches a non-blocking position.

13. A photographic shutter of the double-ended blade type comprising a blade ring rotatable in a running-down direction to open and close shutter blades when making an exposure and rotatable in an opposite tensioning direction while tensioning the shutter ready for another exposure, a spring-powered master member operatively connected to said blade ring and movable in a first running-down direction to cause rotation of said blade ring in its running-down direction and movable in a second tensioning direction to cause rotation of said blade ring in its tensioning direction, an intercepting member movable between a non-blocking position and a blocking position effective to hold said master member substantially stationary at an intermediate point in its running down movement with the shutter blades substantially fully open, a spring independent of the spring power of said master member tending to move said intercepting member from blocking position to non-blocking position, and means operated by movement of said blade ring in its said opposite tensioning direction for concomitantly tensioning the independent spring of said intercepting member and moving said intercepting member to blocking position.

14. A photographic shutter of the double-ended blade type comprising a blade ring rotatable in a running-down direction to open and close shutter blades when making an exposure and rotatable in an opposite tensioning direction while tensioning the shutter ready for another exposure, a spring-powered master member operatively connected to said blade ring and movable in a first running-down direction to cause rotation of said blade ring in its running-down direction and movable in a second tensioning direction to cause rotation of said blade ring in its tensioning direction, an intercepting member movable between a non-blocking position and a blocking position effective to hold said master member substantially stationary at an intermediate point in its running down movement with the shutter blades substantially fully open, a spring independent of the spring power of said master member tending to move said intercepting member from blocking position to non-blocking position, gear train retarding means for controlling the time required for movement of said intercepting member from blocking position to non-blocking position, said intercepting member being so shaped that during such movement from blocking position to non-blocking position said master member is held substantially completely stationary, and means operated by movement of said blade ring in its said opposite tensioning direction for tensioning the independent spring of said intercepting member and for moving said intercepting member from non-blocking position to blocking position.

15. A photographic shutter comprising a shutter blade operating member movable in one direction to open shutter blades to make an exposure and then to close them and movable in a reverse direction to prepare the shutter for another exposure, an intercepting member cooperating with said operating member and having a non-blocking position with respect to said operating member and having a range of blocking positions in any one of which said intercepting member holds said operating member substantially stationary with the shutter blades fully open, a flywheel of relatively heavy mass and large inertia operatively connected to said intercepting member to be turned during movement of said intercepting member from a blocking position toward non-blocking position, a spring independent of said operating member tending to move said intercepting member toward non-blocking position, a retarding gear train including a first gear positioned near said flywheel to be driven by movement of said flywheel, the parts being so arranged that there may be an initial gap between a driving part of said flywheel and a driven part of said first gear, said gear train also including an escapement wheel and a vibrating anchor adjustable to a variable depth of engagement with said escapement wheel, and a shutter speed controlling cam shiftable to different positions and effective to vary the tension of said spring, the size of the initial gap between the driving part of the flywheel and the driven part of the first gear, and the depth of engagement of said vibrating anchor with said escapement wheel.

References Cited in the file of this patent
UNITED STATES PATENTS
1,287,045    Klein _____ Dec. 10, 1918